United States Patent [19]

Dillman

[11] 4,264,213

[45] Apr. 28, 1981

[54] DESEGREGATION PREVENTING MEANS FOR ASPHALT MIX STORAGE APPARATUS

[75] Inventor: Bruce A. Dillman, Prairie du Chien, Wis.

[73] Assignee: Bituma-Stor, Inc., Marquette, Iowa

[21] Appl. No.: 48,280

[22] Filed: Jun. 13, 1979

[51] Int. Cl.³ .............................................. B28C 5/04
[52] U.S. Cl. ........................................ 366/9; 138/39; 141/286; 193/32; 414/299
[58] Field of Search ................ 366/1, 9, 42, 336, 337; 193/2 R, 2 C, 3, 32; 414/293, 299; 141/286; 138/39; 406/159, 160

[56] References Cited

U.S. PATENT DOCUMENTS

| | | | |
|---|---|---|---|
| 670,222 | 3/1901 | Campbell | 366/9 |
| 684,696 | 10/1901 | Lange | 193/32 X |
| 1,096,103 | 5/1914 | Giesler | 366/9 X |
| 1,885,828 | 11/1932 | Houghton | 406/160 |
| 2,050,774 | 8/1936 | Wilcox | 193/32 X |
| 3,868,149 | 2/1975 | Weaver et al. | 406/160 |

FOREIGN PATENT DOCUMENTS 643069 3/1937 Fed. Rep. of Germany ............. 193/32
581849 10/1946 United Kingdom ..................... 366/337

*Primary Examiner*—Philip R. Coe
*Attorney, Agent, or Firm*—James E. Nilles; James R. Custin

[57] ABSTRACT

In storage apparatus wherein asphalt hot mix is moved by gravity along a chute from the top of a bucket elevator to the inlet of a batching hopper at the top of a storage bin, a baffle in the chute, over the inlet, prevents segregation of mix entering the hopper. The baffle is spaced forwardly of the front end of the chute bottom wall, is oriented generally vertically and transversely to the length of the chute, and is flatwise swingable backward and forward. By means of a set screw through a front wall of the chute the position of swinging motion of the baffle is so adjusted that coarse mix components, carried against the baffle by momentum, are deflected by it towards the center of the hopper. Adjustable remixing baffles in the chute, adjacent its side walls and behind the front end of its bottom wall, deflect material away from the chute side walls to effect remixing of aggregate that became segregated during its charging into the bucket elevator.

6 Claims, 2 Drawing Figures

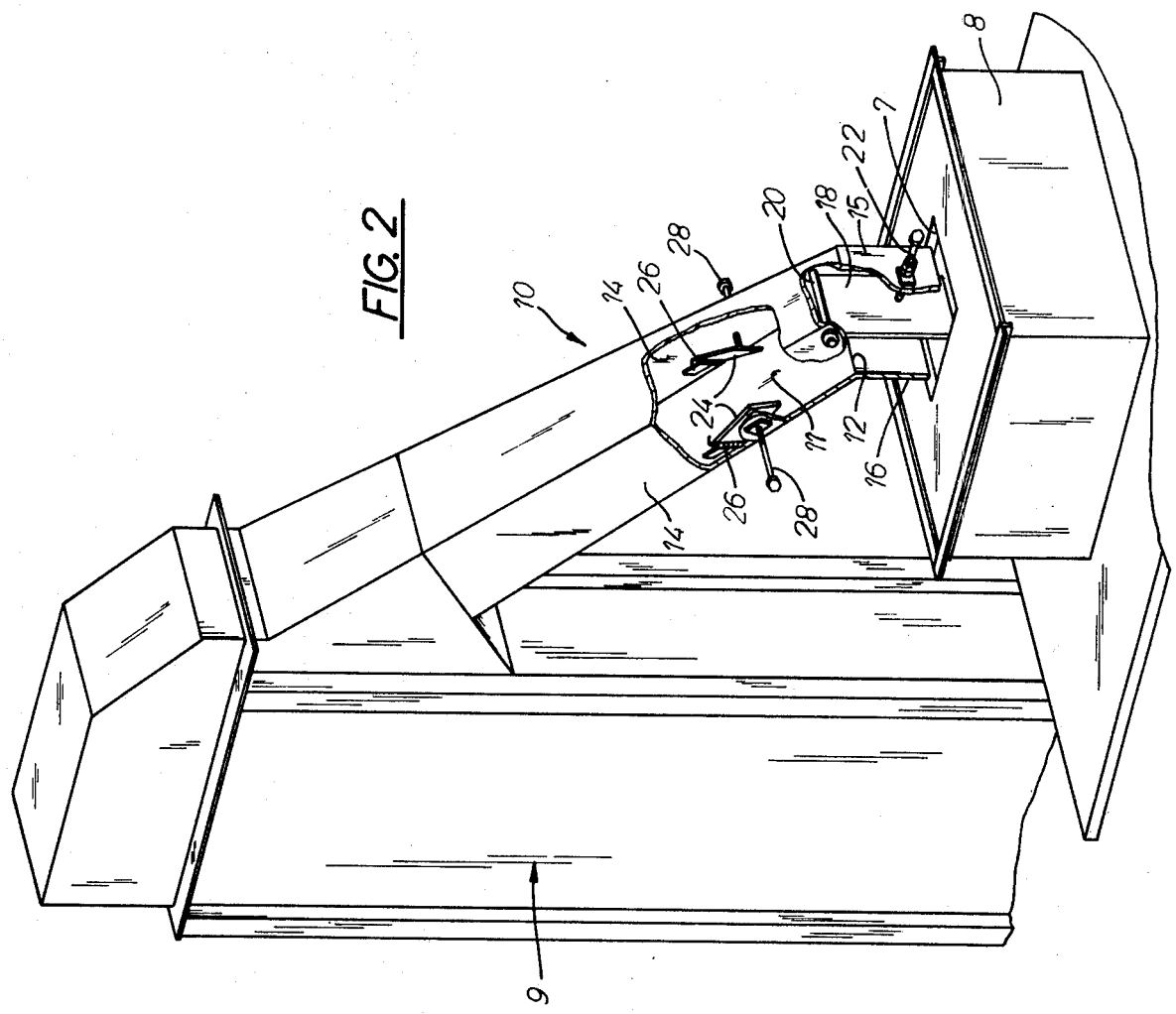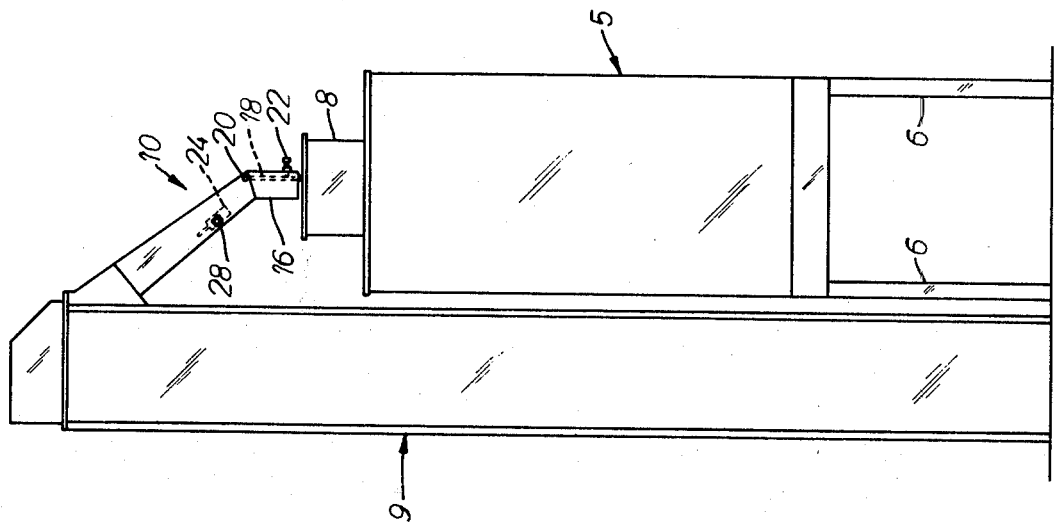

DESEGREGATION PREVENTING MEANS FOR ASPHALT MIX STORAGE APPARATUS

FIELD OF THE INVENTION

This invention relates to apparatus for storage of asphalt aggregate hot mix, of the type comprising a storage bin having an inlet at its top, an elevator adjacent to the bin by which asphalt mix is raised to a level above that of the bin inlet, and a chute by which asphalt mix is conducted to the inlet from the top of the elevator; and the invention is more particularly concerned with means for preventing segregation of the components of asphalt aggregate mix as the mix passes into the inlet in the bin.

BACKGROUND OF THE INVENTION

Asphalt aggregate hot mix that is used for paving is composed of aggregate particles of various sizes, such as sand and crushed rock together with an asphaltic binder. The material is usually mixed in a drum mixer or a pug mill and is then stored more or less temporarily in a thermally insulated storage bin pending its transport to a site where it is to be used. The storage bin is a relatively tall silo-like structure that is mounted on legs which support its bottom outlet at a high enough elevation so that a truck can be driven under it for loading. The mixed material is fed into an inlet in the top of the storage bin by means of an elevator to which the pug mill or mixing drum discharges.

In recent years the type of elevator that has come to be preferred for asphalt mix storage plants is a bucket elevator that extends straight up alongside the storage bin. Since the top of the elevator is laterally spaced from the storage bin inlet, the elevator extends up to a level substantially above that of the inlet, and asphalt mix is carried across the intervening portion of the storage bin by gravity, in an inclined chute that extends obliquely downwardly from the elevator to the inlet.

Although the bucket elevator is superior in most respects to the slat conveyor formerly most commonly used for filling asphalt mix storage bins, one disadvantage that has appeared with bucket elevator installations is a tendency towards segregation of the components of the asphalt mix. A satisfactory paving material is a very uniform mixture of fines, coarse components and asphaltic binder. Heretofore, however, when asphalt mix material was charged into a storage bin from a bucket elevator, the larger components of the mix tended to settle out close to the cylindrical wall of the storage bin, sometimes predominantly at one side of the bin, while the fines tended to remain in the middle of the bin. Once such segregation had occurred, the material remained segregated, since little or no mixing takes place during discharge of the material from the storage bin into a truck.

Segregation of mix materials has been a long standing problem in connection with storage bins for asphalt aggregate mix. One expedient now generally used to prevent or minimize segregation is the provision of a hopper in the upper portion of the storage bin into which the incoming material is initially charged. Until the hopper is substantially filled, its bottom outlet remains closed, but then the outlet is abruptly and briefly opened to dump the entire contents of the hopper batchwise into the storage bin proper. If the mix material were run directly into the storage bin at a more or less steady rate, a cone of fines would build up in the center of the bin, and coarser material would roll down the flanks of the cone and settle along the wall. When the storage bin is filled by dumping material batchwise into it from a hopper, the build-up of such a cone is prevented, but filling the bin in this manner cannot effect a remixing of the materials if segregation has already occurred during charging of material into the hopper.

Bucket elevators have been in use for several years in connection with asphalt mix storage apparatus, and during that time it has come to be generally recognized that a bucket elevator induces a segregation problem even when the storage bin is equipped with a batch charging hopper; but no solution to that problem has heretofore been available.

The present invention is based upon a recognition that a substantial amount of segregation at the charging hopper is promoted by the chute along which the material moves by gravity from the elevator to the storage bin inlet. The fines tend to slide along the bottom of that chute and to be impeded by friction, whereas the larger components tend to move along the chute more freely and therefore have substantially more forward inertia as they fall from the chute into the hopper. As a result, the coarser components of the mix tend to accumulate at one side of the hopper while the fines accumulate at its other side, and, as pointed out above, once such segregation has occurred, it persists all the way to the site of use.

It has also been found that a certain amount of segregation takes place as the mix is charged into the bucket elevator, inasmuch as the material is transferred from the mixing apparatus to the elevator by means of a chute along which it flows by gravity. In this case, too, the greater forward inertia of the coarse components tends to separate them from the fines, so that the material is already segregated in the elevator buckets.

SUMMARY OF THE INVENTION

The general object of the present invention is to provide means for preventing segregation of asphalt mix as it enters the inlet of a storage bin in apparatus of the character described.

In one of its embodiments the invention has the broader object of providing means for ensuring that asphalt aggregate mix will enter the inlet of a storage bin as a substantially uniform, homogeneous mixture, even though a substantial amount of segregation of the mixture components may have occurred as the material was fed to a bucket elevator by which it was carried up for charging into the storage bin inlet, and notwithstanding that the material flows by gravity along a chute which conducts it from the top of the elevator to the storage bin inlet.

Having in mind that there can be substantial variations in the components of different asphalt aggregate mixes, and that every such mix tends to have its own peculiar characteristics of flow and segregation, it is another object of this invention to provide anti-segregation means in asphalt mix storage apparatus that is effective with whatever mix composition may be filled into the bin.

The invention thus solves a problem that has heretofore existed in connection with asphalt mix storage apparatus that comprises a storage bin having an inlet at its top, an elevator adjacent to said storage bin by which asphalt mix is raised to a level above that of said inlet, and a chute whereby asphalt mix discharged from the elevator is conducted to said inlet, said chute comprising an elongated and lengthwise inclined bottom wall that has an upper rear portion near the top of said elevator and a lower front end upwardly adjacent to said inlet. The invention provides means for preventing segregation of the components of asphalt mix entering said inlet, said means comprising: a generally upright baffle over said inlet, extending transversely to said bottom wall and spaced forwardly from said front end thereof, said baffle being of a height to extend to levels substantially above and substantially below the level of said front end of the bottom wall and being mounted to swing flatwise forwardly and rearwardly about a substantially horizontal axis; and baffle control means comprising manual adjustment means accessible at the exterior of the chute for defining at least a forward limit of swinging motion of the baffle that is adjustably so variable as to enable the baffle to deflect to a predetermined location beneath said inlet such material as impinges it in moving forwardly from said front end of the bottom wall.

Where segregation takes place at or before discharge of asphalt mix from the elevator to said chute and said chute further comprises opposite substantially vertical side walls projecting up from said bottom wall, the invention is further characterized by: a pair of adjustable further baffles in said chute, one for each of said side walls, in a zone near to but spaced rearwardly from said front end of the bottom wall, each of said further baffles having a bottom edge adjacent to said bottom wall and being flatwise swingable to and from a position flatwise overlying its side wall, about an axis which extends along a rear edge of the further baffle and is parallel to its side wall and normal to said bottom wall; and other adjustable baffle control means on said chute for maintaining each of said further baffles in an adjustably variable position of its swinging motion.

BRIEF DESCRIPTION OF THE DRAWINGS

In the accompanying drawings, which illustrate what is now regarded as a preferred embodiment of the invention:

FIG. 1 is a more or less diagrammatic view in elevation of asphalt aggregate hot mix storage apparatus that embodies the principles of this invention; and FIG. 2 is a fragmentary perspective view on an enlarged scale of the upper portion of the apparatus shown in FIG 1., with portions of the chute shown broken away to reveal the baffles.

DETAILED DESCRIPTION OF THE INVENTION

Referring now to the accompanying drawings, asphalt mix storage apparatus conventionally comprises a thermally insulated silo-like storage bin 5 in which hot asphalt aggregate mix is retained and kept hot during a period after it is mixed and until such time as it is to be loaded into a truck for transport to a site of use. The storage bin is mounted on legs 6 which support its bottom at an elevation high enough to permit a truck (not shown) to be driven under it for loading from a bottom discharge outlet (not shown) in the bin.

Asphalt mix is filled into the storage bin 5 through a charging inlet 7 at its top, which, as shown, is defined by an upwardly opening hopper 8 on the top of the bin, into which the mix is fed more or less steadily and from which the mix is from time to time dropped batchwise into the storage bin proper. Structural details of the hopper 8 are not shown inasmuch as such hoppers are conventional in asphalt mix storage apparatus. The lateral dimensions of the hopper 8 are substantially smaller than the diameter of the storage bin 5, and the hopper is centered on the top of the storage bin so that the dropped material will be rather uniformly dispersed across the bin.

As is now becoming conventional in asphalt mix storage apparatus, asphalt mix to be filled into the bin 5 is lifted to a level above that of the bin inlet 7 by means of a bucket elevator 9 which extends up alongside the storage bin. It will be understood that the asphalt aggregate is mixed in a pug mill or mixing drum (not shown) from which it is conducted to the bucket elevator 9 by means of a chute or the like (not shown).

At the top of the bucket elevator 9 the asphalt mix is discharged into a chute 10 by which it is conducted to the storage bin inlet 7. The top of the elevator 9 is at a level substantially above that of the bin inlet 7 so that the material can flow through the chute 10 by gravity and can be carried by the chute across the portion of the storage bin that intervenes between the bucket elevator 9 and the inlet 7.

The chute 10 comprises an elongated, lengthwise inclined bottom wall 11 that has a rear upper portion near the top of the elevator 9 and has a lower front end 12 which is over the bin inlet 7. The chute also comprises opposite substantially vertical side walls 14 which project up from its bottom wall 11 and extend forwardly across the bin inlet 7 a substantial distance beyond the front end 12 of the bottom wall. At their front ends the side walls 14 connect with a transversely extending upright front wall 15 which is spaced a substantial distance forward of the front end 12 of the bottom wall but is over the bin inlet 7. The front portions of the side walls 14 project below the level of the front end 12 of the bottom wall as well as above it, and they cooperate with the front wall 15 to define a vertical outlet portion 16 for the chute which opens downwardly to the bin inlet 7.

The anti-segregation means of the present invention comprises a baffle plate 18 in the vertical outlet portion 16 of the chute, oriented more or less vertically and transversely to the bottom wall 11, that is, generally parallel to the front wall 15. The baffle plate 18 is preferably rectangular, as shown, and is wide enough to extend substantially entirely across the outlet portion 16 of the chute and is of such height as to extend substantial distances both above and below the level of the front end 12 of the bottom wall 11. The baffle 18 is flatwise swingable forwardly and rearwardly about a transverse axis that is spaced from both the front wall 15 and the front end 12 of the bottom wall, and it is preferably mounted for such swinging motion by means of a shaft 20 that extends along its upper edge and has opposite end portions journaled in the side walls 14 of the chute.

At any given time, the particular position of swinging motion in which the baffle 18 will be established is determined by manually adjustable baffle control means comprising a set screw 22 that is threaded through the front wall 15 of the chute at a level some distance below that of the shaft 20. The inner end of the set screw 22 provides an abutment which is engaged by the baffle 18 to define a forward limit of its swinging motion. The outer end of the set screw is of course accessible for adjustment at the exterior of the chute.

In the most forward positions of adjustment of the set screw 22 it is normally not engaged by the baffle plate 18, which then hangs straight down at a distance behind it; but the baffle plate can then be forced back against the set screw by material moving forwardly off the front end of the chute bottom wall 11 and carried against the baffle plate by its forward momentum. In most cases the set screw 22 will be adjusted to hold the baffle 18 at a rearwardly and downwardly oblique angle, so that coarse materials carried forward by momentum and impinging against the baffle will be deflected rearwardly by it. The amount of such rearward deflection will depend upon the angular position of the baffle 18, which is in turn dependent upon the position of adjustment of the set screw 22; and the baffle is properly set when the coarse materials tend to be deposited in or near the center of the hopper.

As filling of asphalt mix into the bin 5 begins, an operator will observe the relative distribution of coarse and fine aggregate materials as they fall into the hopper 8. If the material in the hopper tends toward segregation, the set screw 22 is adjusted as necessary to obtain uniformity. Once the set screw 22 is properly adjusted for a particular aggregate composition, its setting can be maintained. If asphalt mix having a different aggregate formulation is to be stored in the bin 5, a new adjustment of the set screw 22 may be necessary, but it will be evident that such adjustments are quickly and easily made.

To overcome segregation of asphalt mix that occurs as the material is charged into the bucket elevator 9, there are two remixing baffles 24 in the interior of the chute, each inwardly adjacent to one of the side walls 14 and both located in the lower portion of the chute but at a distance behind the front end 12 of the bottom wall. Each of the remixing baffles 24 is rectangular and is hingedly mounted on its side wall 14 to swing to and from a non-deflecting position in which the baffle closely flatwise overlies its side wall. Each baffle 24 can be swung out of that position through a range of deflecting positions in which it projects obliquely forwardly and laterally inwardly from its side walls.

Specifically, each remixing baffle 24 has a hinge connection 26 with its chute side wall 14 whereby the baffle is swingable about an axis that extends along a rear edge of the baffle, which axis is inwardly adjacent to the side wall 14 and parallel to it and is perpendicular to the bottom wall 11 of the chute. The bottom edge of each baffle 24 is closely adjacent to the bottom wall 11 of the chute so that the baffle can effectively perform its remixing function. A set screw 28 extends through each of the vertical chute side walls 14 and engages the adjacent remixing baffle 24 between its hingedly connected rear edge and its free front edge so that the angle between each baffle 24 and its adjacent chute side wall 14 depends upon how far its set screw 28 is turned in.

As asphalt mix material slides forwardly and downwardly along the inclined bottom wall 11 of the chute, each of the remixing baffles 24 that is in an oblique deflecting position diverts a portion of such material away from its adjacent vertical wall 14, thus bringing about a certain amount of remixing of the material flowing through the chute. As the baffle 24 is increasingly swung away from its non-deflecting position, it deflects increasing proportions of the material moving along the chute and displaces the deflected material increasingly farther away from its adjacent side wall 14.

As with the baffle 18, proper positioning of each of the remixing baffles 24 is accomplished by watching the material as it enters the hopper 8 and adjusting each of the set screws 28 as necessary to cause the mixture to be uniform across the width of the hopper.

It will be evident that there is no difficulty in determining which of the several baffles 18, 24 needs adjustment if the mixture entering the hopper 8 is non-homogeneous. If the mixture is non-uniform from front to rear of the hopper 8 (i.e., along the direction in which the chute 10 extends), then the baffle 18 needs adjustment; whereas if the material in the hopper is non-uniform in the lateral direction, then adjustment of one or both of the remixing baffles 24 is required.

From the foregoing description taken with the accompanying drawings it will be apparent that this invention provides simple and effective means for preventing segregation of asphalt mix being fed into a storage bin by means of a bucket elevator, and that the anti-segregation means of this invention can be very readily adjusted to accommodate variations in asphalt mix composition.

I claim:

1. In asphalt mix storage apparatus that comprises a storage bin having an inlet at its top, an elevator adjacent to said storage bin by which asphalt mix is raised to a level above that of said inlet, and a chute whereby asphalt mix discharged from the elevator is conducted to said inlet, said chute comprising an elongated and lengthwise inclined bottom wall that has an upper rear portion near the top of said elevator and a lower front end upwardly adjacent to said inlet, means for preventing segregation of the components of asphalt mix entering said inlet, said means comprising:
   A. a generally upright baffle over said inlet, extending transversely to said bottom wall and spaced forwardly from said front end thereof, said baffle
      (1) being of a height to extend to levels substantially above and substantially below the level of said front end of the bottom wall and
      (2) being mounted to swing flatwise forwardly and rearwardly about a substantially horizontal axis; and
   B. baffle control means comprising manual adjustment means accessible at the exterior of the chute for defining at least a forward limit of swinging motion of the baffle that is adjustably so variable as to enable the baffle to deflect to a predetermined location beneath said inlet such material as impinges it in moving forwardly from said front end of said bottom wall.

2. The asphalt mix storage apparatus of claim 1 wherein said chute further comprises a substantially upright front wall that is spaced forwardly of said baffle, and wherein the baffle is freely swingable about said axis and said axis is fixed and is near a laterally extending edge of the baffle, further characterized by:
   said baffle control means comprising a set screw extending through said front wall and having an inner end portion which provides an abutment that is spaced from said axis and is engageable by the baffle to define said forward limit of its swinging motion.

3. The asphalt mix storage apparatus of claim 1 wherein said chute further comprises opposite substantially vertical side walls projecting up from said bottom wall, further characterized by:

C. a pair of adjustable further baffles in said chute, one for each of said side walls, in a zone near to but spaced rearwardly from said front end of the bottom wall, each of said further baffles
  (1) having a bottom edge adjacent to said bottom wall and
  (2) being flatwise swingable to and from a position flatwise overlying its side wall, about an axis which extends along a rear edge of the further baffle and is parallel to its side wall and normal to said bottom wall; and
D. other adjustable baffle control means on said chute for maintaining each of said further baffles in an adjustably variable position of its swinging motion.

4. Asphalt mix storage apparatus that comprises a storage bin having an inlet at its top, an elevator adjacent to said storage bin by which asphalt mix is raised to a level above that of said inlet, and a chute whereby asphalt mix discharged from the elevator is conducted into the inlet, said chute comprising an elongated and lengthwise inclined bottom wall that extends forwardly and downwardly from the top of the elevator and has a lower front end spaced above said inlet, a transverse substantially vertical front wall spaced forwardly from said front end of the bottom wall, and opposite upright side walls which project forwardly beyond said bottom wall and which are connected with said front wall to cooperate therewith in defining an outlet portion of the chute that opens downwardly to said inlet, said storage apparatus being characterized by means for preventing segregation of asphalt mix components entering said inlet, said means comprising:
  A. a substantially flat baffle plate having an upper edge;
  B. pivot means mounting said baffle plate pendently in said outlet portion of the chute, between said front wall and said front end of the bottom wall, for flatwise forward and rearward swinging motion about a transverse horizontal axis which substantially extends along said upper edge of the baffle plate and which is at a level above that of said front end of the bottom wall; and
  C. a set screw extending through said front wall to have an outer portion accessible for adjustment at the exterior of said front wall and an inner portion which is spaced below said axis and which provides an abutment against which the baffle plate is engageable to define an adjustably changeable forward limit of its swinging motion, adjustability of said set screw enabling the baffle plate to deflect to a predetermined location beneath said outlet portion such material as impinges it in moving forwardly from said front end of said bottom wall.

5. The asphalt mix storage apparatus of claim 4, further characterized by:
  D. a pair of further adjustable baffles over said bottom wall, near said front end thereof, each of said further baffles
    (1) being inwardly adjacent to one of said side walls,
    (2) being flatwise swingable to and from a position flatwise overlying its adjacent side wall about an axis which extends along a rear edge of the further baffle and which is parallel to its adjacent side wall and substantially perpendicular to said bottom wall, and
    (3) having a bottom edge adjacent to said bottom wall; and
  E. other set screws, each extending through one of said side walls, for adjustably establishing the position of swinging motion of each of said further baffles.

6. Asphalt mix storage apparatus comprising a storage bin having an inlet at its top, an elevator adjacent to said storage bin whereby asphalt mix is raised to a level above that of said inlet, and a chute whereby asphalt mix discharged from the elevator is conducted from said level and across a horizontal distance to said inlet, said chute comprising an elongated and lengthwise inclined bottom wall that extends obliquely forwardly and downwardly towards said inlet and has a lower front end near said inlet and opposite side walls projecting upwardly from said bottom wall, said apparatus being characterized by means for effecting remixing of the components of asphalt mix that have become segregated in the course of movement towards said lower front end of said bottom wall, said means comprising:
  A. a pair of remixing baffles, one for each of said side walls, each hingedly connected to the chute inwardly adjacent to its side wall
    (1) at a location near to but spaced to the rear of said front end of the bottom wall,
    (2) for flatwise swinging motion about an axis that extends along a rear edge of the baffle and is perpendicular to said bottom wall, to and from a non-deflecting position of the baffle in which it closely flatwise overlies the inner surface of its side wall, through a range of deflecting positions in which the baffle extends obliquely forward and laterally inward in relation to its side wall, and
    (3) with a bottom edge of the baffle adjacent to said bottom wall; and
  B. adjustable means on the chute for holding each of said remixing baffles in any selected one of its positions of swinging motion.

* * * * *